United States Patent [19]
Santilli

[11] 3,886,159
[45] May 27, 1975

[54] ESTERS OF 6-(SUBSTITUTED)-5,6,7,8-TETRA-HYDRO-8-ETHYL-5-OXO-2-(METHYLTHIO)PYRIDO[2,3-D]PYRIMIDINE-6-CARBOXYLIC ACIDS

[75] Inventor: Arthur A. Santilli, Havertown, Pa.

[73] Assignee: American Home Products Corporation, New York, N.Y.

[22] Filed: Mar. 29, 1974

[21] Appl. No.: 456,403

[52] U.S. Cl............................ 260/256.5; 424/251
[51] Int. Cl........................................ C07d 51/40
[58] Field of Search................................ 260/256.5

[56] References Cited
UNITED STATES PATENTS

| | | | |
|---|---|---|---|
| 3,299,066 | 1/1967 | Papesch | 260/256.4 |
| 3,641,027 | 2/1972 | Santilli et al. | 260/256.4 F |

OTHER PUBLICATIONS

Chemical Abstracts, 75:137944d, (1971).
Chemical Abstracts, 73:66530m, (1970).
Pesson et al., C. R. Acad. Sci., Vol. 278, Series C, No. 10, pp. 717–719.

*Primary Examiner*—Albert T. Meyers
*Assistant Examiner*—Leonard Schenkman
*Attorney, Agent, or Firm*—David E. Frankhouser

[57] ABSTRACT

Lower alkyl esters of 6-methyl and 6-(lower)alkoxycarbonylmethyl-5,6,7,8-tetrahydro-8-ethyl-5-oxo-2-(methylthio)pyrido[2,3-d]-pyrimidine-6-carboxylic acids have antiamebic activity. Said compounds are prepared from the (lower)alkylesters of 8-ethyl-7,8-dihydro-5-hydroxy-2-(methylthio)pyrido[2,3-d]pyrimidine-6-carboxylic acid.

6 Claims, No Drawings

ESTERS OF 6-(SUBSTITUTED)-5,6,7,8-TETRA-HYDRO-8-ETHYL-5-OXO-2-(METHYLTHIO)PYRIDO[2,3-D]PYRIMIDINE-6-CARBOXYLIC ACIDS

8-Alkyl-2-(methylthio)-5,8-dihydro-5-oxopyrido[2,3-d]pyrimidine-6-carboxylic acids and the esters thereof are described in Japanese Pat. No. 25911/67. [See also Minami, et al., Chem. Pharm. Bull., 19, 1482(1971)]. 8-Alkyl-5,6,7,8-tetrahydro-5-oxo-2-(methylthio)pyrido[2,3-d]pyrimidine-6-carbonitriles are described in U.S. Pat. No. 3,641,027.

This invention relates to compounds classified in the art of chemistry as lower alkyl esters of 6-(substituted)-5,6,7,8-tetrahydro-8-ethyl-5-oxo-2-(methylthio)pyrido[2,3-d]pyrimidine-6-carboxylic acids and to intermediates thereto.

In its first aspect, the invention sought to be patented comprises chemical compounds having the structural formula:

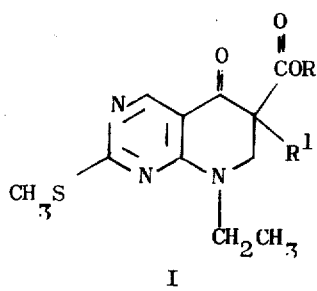

I wherein R is (lower)alkyl and R¹ is methyl or (lower)alkoxycarbonylmethyl. The compounds of Formula I, wherein R and R¹ are as hereinabove described, possess activity against Endameba histolytica as demonstrated in standard in vitro microbiological tests. Hence, the compounds are useful for controlling the growth of said organism.

In its second aspect, the invention sought to be patented comprises a (lower)alkyl ester of 8-ethyl-7,8-dihydro-5-hydroxy-2-(methylthio)pyrido[2,3-d]pyrimidine-6-carboxylic acid and the alkali metal enolate salts thereof. Said compounds can be used as intermediates for the preparation of the antiamebic compounds of Formula I.

The compounds of Formula I are, in general, prepared in two steps according to the following method:

Ethyl 4-chloro-2-methylthio-5-pyrimidine carboxylate is condensed with a (lower)alkyl 3-ethylaminopropionate in the presence of a weak base, such as sodium carbonate, to afford an open chain compound which is cyclized in situ in the presence of an alkali metal (lower)alkanolate to give an intermediate which is a (lower)alkyl ester of 8-ethyl-7,8-dihydro-5-hydroxy-2-(methylthio)pyrido[2,3-d]pyrimidine-6-carboxylic acid in the form of an alkali metal enolate salt. This salt is then treated with either methyl iodide or a (lower)alkyl iodoacetate in N,N-dimethyl formamide to give the appropriate compound of Formula I.

If desired, the intermediate in the form of the enolate salt can be converted to the free enol form by acidification. It will be appreciated that, although the acidified intermediate is named as an enol, said intermediate is capable of existing in the keto form. Infrared and nuclear magnetic resonance spectrographic data indicate that the enol is the predominate form. It is understood that both the enol and keto form are equivalent for purposes of the invention since treatment of either form with an alkali metal hydroxide will give the enolate salt.

The starting material ethyl 4-chloro-2-methylthio-5-pyrimidine carboxylate is a known compound. The (lower)alkyl N-ethylaminopropionates are prepared in a known manner by reacting ethylamine with a (lower)alkyl ester of acrylic acid.

As used herein and in the claims the terms "lower alkyl" or "lower alkanolate" means a group having from 1 to 4 carbon atoms. The term "alkali metal" means the sodium, potassium, or lithium cations.

The following examples are illustrative of the compounds of Formula I and the method for demonstrating and eliciting the antiamebic activity thereof:

EXAMPLE I

8-Ethyl-7,8-Dihydro-5-Hydroxy-2-(Methylthio)Pyrido-[2,3d]Pyrimidine-6-Carboxylic Acid, Ethyl Ester A stirred mixture of 11.65 g of ethyl 4-chloro-2-methyl-thio-5-pyrimidine carboxylate, 7.2 g of ethyl 3-ethylaminopropionate and 5.3 g of sodium carbonate in 250 ml of ethanol is heated under reflux for 2 hr. The reaction mixture is filtered under suction. The filtrate is transferred to a 500 ml flask and a solution of sodium ethoxide (1.2 g of sodium in 100 ml of ethanol) is added. The reaction mixture is heated with stirring under reflux for 10 minutes during which a yellow precipitate is deposited. The reaction mixture is cooled in ice and filtered. The filter cake (sodium salt) is suspended in 400 ml of water and acidified with glacial acetic acid. The resulting product is collected on a filter and dried. Weight of title compound: 11.8 g; m.p. 151°–154°C. Recrystalization from ethanol gives a sample, m.p. 155°–157°C.

| Analysis for: | $C_{13}H_{17}N_3O_3S$ |
|---|---|
| Calculated: | C, 52.87; H, 5.80; N, 14.23; S, 10.85 |
| Found: | C, 52.94; H, 5.85; N, 14.57; S, 10.68 |

EXAMPLE II

8-Ethyl-5,6,7,8-Tetrahydro-6-Methyl-2-(methylthio)-5-Oxopyrido[2,3-d]Pyrimidine-6-Carboxylic Acid Ethyl Ester To a solution of 6.35 g of the sodium salt of 8-ethyl-7,8-dihydro-5-hydroxy-2-(methylthio)pyrido[2,3-d]pyrimidine-6-carboxylic acid, ethyl ester in 30 ml of N,N-dimethylformamide is added 6.35 g of methyl iodide. After the heat of reaction diminishes, the reaction mixture is heated on a hot plate (ca, 50°) for a few minutes and then allowed to stand at room temperature for 1 hr. The reaction mixture is poured into 400 ml of water. An oily residue is deposited and crystallizes on cooling and scratching. Weight of title product: 4.9 g; m.p. 82°–87°C. Recrystallization from petroleum ether gives 4.2 g of product, m.p. 97°–98°C.

| Analysis for: | $C_{14}H_{19}N_3O_3S$ |
|---|---|
| Calculated: | C, 54.35; H, 6.19; N, 13.58; S, 10.36 |
| Found: | C, 54.12, H, 6.06, N, 13.78. S. 10.23 |

EXAMPLE III

6-Carboxy-8-Ethyl-5,6,7,8-Tetrahydro-2-(methylthio)-5-Oxopyrido[2,3-d]pyrimidine-6-Acetic Acid, Diethyl Ester To a solution of 5.13 g of the sodium salt of 8-ethyl-7,8-dihydro-5-hydroxy-2-(methylthio)pyrido[2,3-d]pyrimidine-6-carboxylic acid, ethyl ester in 50 ml of N,N-dimethylformamide is added 6.28 g of ethyl iodoacetate. After the initial heat of reaction diminishes, the reaction mixture is heated on a hot plate (40°–50°) for a few minutes and allowed to stand at room temperature for 3 hr. The reaction mixture is poured into 400 ml of water. A crystalline product is obtained. Weight of title product: 5.45 g; m.p. 110°–113°C. Recrystallization from ethanol affords 4.0 g of product, m.p. 112°–114°C.

| Analysis For: | $C_{17}H_{23}N_3O_5S$ |
|---|---|
| Calculated: | C, 53.53; H, 6.08; N, 11.01; S, 8.40 |
| Found: | C, 53.69; H, 6.10; N, 11.08; S, 8.50 |

EXAMPLE IV

The antiamebic activity of the compounds is demonstrated and elicited as follows [See Thompson, et al., Antibio. and Chemo., 6, 337(1956)]:

Serial dilutions of the test compound are incorporated in an aqueous phase of modified Boeck-Drbohlav diphasic medium fortified with rice starch. The medium is inoculated with polybacteria and a known number of trophozoites of *E. histolytica* NIH200. After 48 hours incubation at 35°C, the trophozoites are counted. The activity of the test compound is expressed as the minimal inhibitory concentration (MIC) in mg/ml. The MIC is the least amount of the compound that completely inhibits *E. histolytica*.

When tested as above-described, the following results were obtained:

| Compound | MIC (mg/ml) |
|---|---|
| 8-Ethyl-5,6,7,8-tetrahydro-6-methyl-2-(methylthio)-5-oxopyrido[2,3-d]pyrimidine-6-carboxylic acid ethyl ester | 250 (52% kill) |
| 6-Carboxy-8-ethyl-5,6,7,8-Tetrahydro-2-(methylthio)-5-Oxopyrido[2,3-d]pyrimidine-6-Acetic Acid, Diethyl Ester | 250 (48% kill) |

What is claimed is:
1. A compound of the formula:

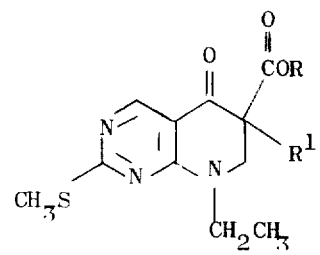

I wherein R is lower alkyl and $R^1$ is methyl or lower alkoxycarbonylmethyl.

2. The compound as defined in claim 1 which is 8-ethyl-5,6,7,8-tetrahydro-6-methyl-2-(methylthio)-5-oxopyrido[2,3-d]pyrimidine-6-carboxylic acid ethyl ester.

3. The compound as defined in claim 1 which is 6-carboxy-8-ethyl-5,6,7,8-tetrahydro-2-(methylthio)-5-oxopyrido[2,3-d]pyrimidine-6-acetic acid, diethyl ester.

4. A compound which is a lower alkyl ester of 8-ethyl-7,8-dihydro-5-hydroxy-2-(methylthio)pyrido[2,3-d]pyrimidine-6-carboxylic acid, or an alkali metal enolate salt thereof.

5. A compound as defined in claim 4 which is 8-ethyl-7,8-dihydro-5-hydroxy-2-(methylthio)pyrido[2,3-d]pyrimidine-6-carboxylic acid, ethyl ester.

6. A compound as defined in claim 4 which is 8-ethyl-7,8-dihydro-5-hydroxy-2-(methylthio)pyrido[2,3-d]pyrimidine-6-carboxylic acid, ethyl ester, sodium salt.

* * * * *